United States Patent
Karafin et al.

(10) Patent No.: US 9,900,510 B1
(45) Date of Patent: Feb. 20, 2018

(54) MOTION BLUR FOR LIGHT-FIELD IMAGES

(71) Applicant: Lytro, Inc., Mountain View, CA (US)

(72) Inventors: Jon Karafin, Morgan Hill, CA (US); Thomas Nonn, Berkeley, CA (US); Gang Pan, Fremont, CA (US); Zejing Wang, Mountain View, CA (US)

(73) Assignee: Lytro, Inc., Mountain View, CA (US)

( * ) Notice: Subject to any disclaimer, the term of this patent is extended or adjusted under 35 U.S.C. 154(b) by 0 days.

(21) Appl. No.: 15/372,968

(22) Filed: Dec. 8, 2016

(51) Int. Cl.
*H04N 5/232* (2006.01)
*H04N 5/238* (2006.01)
*G06T 7/557* (2017.01)

(52) U.S. Cl.
CPC ......... *H04N 5/23267* (2013.01); *G06T 7/557* (2017.01); *H04N 5/238* (2013.01)

(58) Field of Classification Search
CPC .... H04N 5/23267; H04N 5/238; H04N 5/262; G06T 7/557
USPC ................................................ 348/345, 239
See application file for complete search history.

(56) References Cited

U.S. PATENT DOCUMENTS

| | | | |
|---|---|---|---|
| 6,034,690 A | 3/2000 | Gallery et al. | |
| 6,900,841 B1 | 5/2005 | Mihara | |
| 8,811,769 B1* | 8/2014 | Pitts | G06T 3/40 382/275 |
| 2003/0117511 A1 | 6/2003 | Belz et al. | |
| 2006/0256226 A1 | 11/2006 | Alon et al. | |
| 2008/0187305 A1* | 8/2008 | Raskar | G02B 27/0075 396/268 |
| 2010/0003024 A1* | 1/2010 | Agrawal | H04N 5/2254 396/340 |
| 2014/0226038 A1* | 8/2014 | Kimura | H04N 5/2356 348/239 |
| 2015/0206340 A1 | 7/2015 | Munkberg et al. | |
| 2015/0279056 A1 | 10/2015 | Akeley | |
| 2016/0309065 A1* | 10/2016 | Karafin | H04N 5/2254 |
| 2017/0263012 A1* | 9/2017 | Sabater | G06T 7/557 |

OTHER PUBLICATIONS

Munkberg, Jacob, et al., "Layered Reconstruction for Defocus and Motion Blur", EGSR 2014, pp. 1-12.

* cited by examiner

*Primary Examiner* — Nhan T Tran
(74) *Attorney, Agent, or Firm* — Raubvogel Law Office

(57) ABSTRACT

Motion blur may be applied to a light-field image. The light-field image may be captured with a light-field camera having a main lens, an image sensor, and a plurality of microlenses positioned between the main lens and the image sensor. The light-field image may have a plurality of lenslet images, each of which corresponds to one microlens of the microlens array. The light-field image may be used to generate a mosaic of subaperture images, each of which has pixels from the same location on each of the lenslet images. Motion vectors may be computed to indicate motion occurring within at least a primary subaperture image of the mosaic. The motion vectors may be used to carry out shutter reconstruction of the mosaic to generate a mosaic of blurred subaperture images, which may then be used to generate a motion-blurred light-field image.

28 Claims, 13 Drawing Sheets

Multi-view processing

Single-view processing

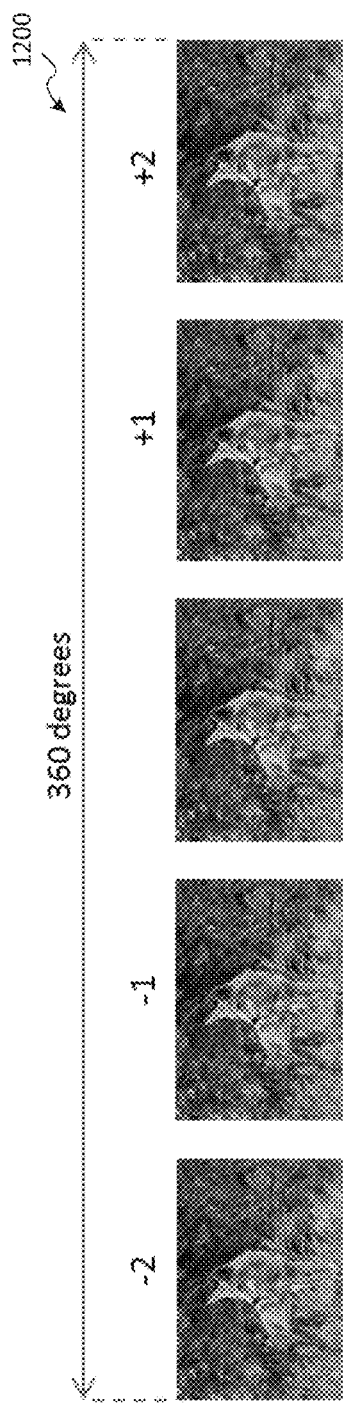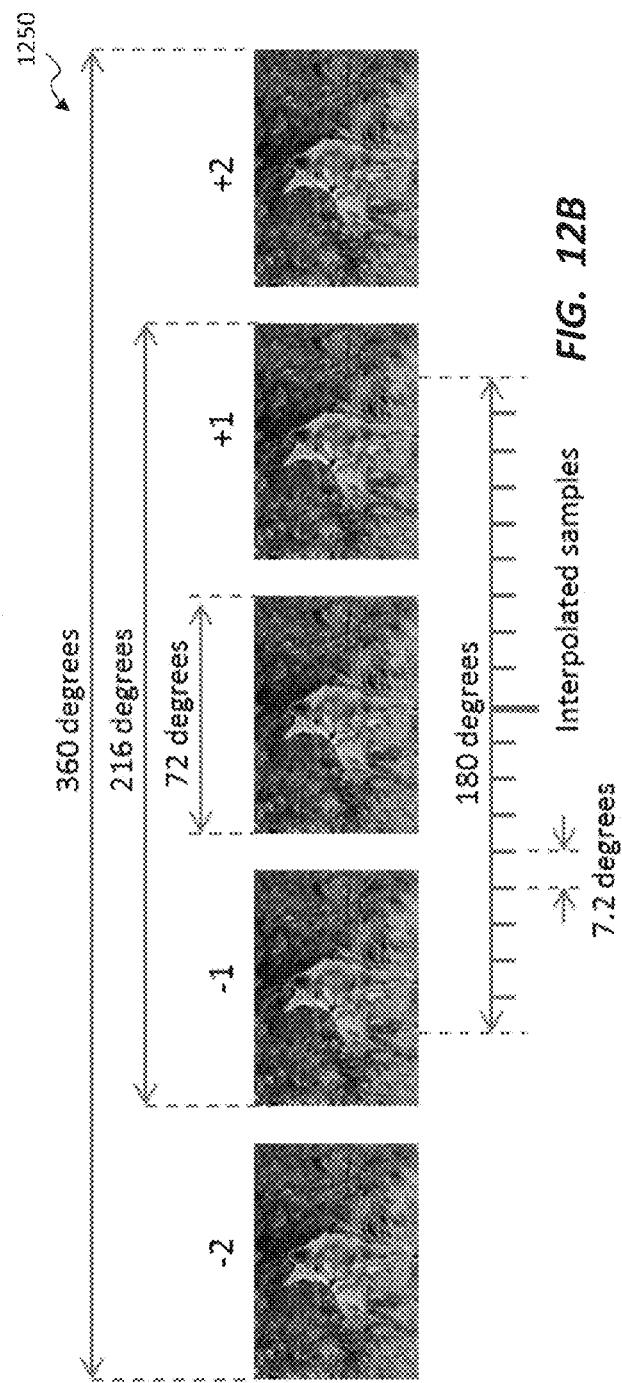
FIG. 12A
FIG. 12B

MOTION BLUR FOR LIGHT-FIELD IMAGES

CROSS-REFERENCE TO RELATED APPLICATIONS

The present application is related to U.S. Utility application Ser. No. 13/774,986 for "Light-Field Processing and Analysis, Camera Control, and User Interfaces and Interaction on Light-Field Capture Devices", filed on Feb. 22, 2013, issued on Mar. 31, 2015 as U.S. Pat. No. 8,995,785, the disclosure of which is incorporated herein by reference in its entirety.

The present application is related to U.S. Utility application Ser. No. 13/688,026 for "Extended Depth of Field and Variable Center of Perspective in Light-Field Processing", filed on Nov. 28, 2012, issued on Aug. 19, 2014 as U.S. Pat. No. 8,811,769, the disclosure of which is incorporated herein by reference in its entirety.

The present application is related to U.S. Utility application Ser. No. 11/948,901 for "Interactive Refocusing of Electronic Images," filed Nov. 30, 2007, issued on Oct. 15, 2013 as U.S. Pat. No. 8,559,705, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, now abandoned, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, issued on Jun. 10, 2014 as U.S. Pat. No. 8,749,620, the disclosure of which is incorporated herein by reference in its entirety.

TECHNICAL FIELD

The present disclosure relates to digital imaging systems and methods, and more specifically, to systems and methods for generating proper motion blur in light-field images.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image.

By contrast, light-field images typically encode additional data for each pixel related to the trajectory of light rays incident to that pixel when the light-field image was taken. This data can be used to manipulate the light-field image through the use of a wide variety of rendering techniques that are not possible to perform with a conventional photograph. In some implementations, a light-field image may be refocused and/or altered to simulate a change in the center of perspective (CoP) of the camera that received the image.

Light-field images raise particular challenges for applying effects such as motion blur. According to techniques used with conventional two-dimensional images, image capture may be carried out at a high frame rate to remove motion blur. Then, the motion blur may be reconstructed by extracting a motion vector to assess the rate of motion of the object. However, such techniques do not support the image processing techniques described above for light-field images, such as changing the center of perspective, as they are limited to a single perspective.

SUMMARY

Various techniques are described herein for applying motion blur to a light-field image. The light-field image may be captured with a light-field camera having a main lens, an image sensor, and a plurality of microlenses positioned between the main lens and the image sensor. The light-field image may have a plurality of lenslet images, each of which corresponds to one microlens of the microlens array. The light-field camera and/or a separate computing device such as a post-processing system may be used to apply the motion blur.

The light-field image may be used to generate a mosaic of subaperture images, each of which has pixels from the same location on each of the lenslet images. Motion vectors may be computed to indicate motion occurring within at least a primary subaperture image of the mosaic. The motion vectors may be used to carry out shutter reconstruction of the mosaic to generate a blur-ready mosaic of subaperture images, which may then be used to generate a motion-blurred light-field image.

In either case, the proximate subaperture images (or subset thereof) may be selected such that the proximate locations are positioned about the center location of the primary subaperture. Further, each set of proximate subaperture images may further be selected such that their proximate locations define a ring that encircles the corresponding primary location on each lenslet image.

Computing the motion vectors may further include applying an optical flow to at least the primary subaperture image or a plurality of subaperture images. The result may be the generation of motion vectors in four-dimensional space by backprojecting the mosaic of motion vectors to the four-dimensional light-field. The resulting motion vectors may provide a full four-dimensional motion vector set defining a three-dimensional flow of objects represented in the light-field image. The motion vectors may further include forward motion vectors indicative of motion of the objects in time subsequent to capture of the light-field image, and backward motion vectors indicative of motion of the objects in time prior to capture of the light-field image.

Using the motion vectors to carry out shutter reconstruction of the mosaic of subaperture images may further include applying back projection of the blur-ready mosaic of subaperture images to generate a four-dimensional light-field. Using the blur-ready mosaic of subaperture images to generate the motion-blurred light-field image may further include transforming the blur-ready mosaic of subaperture images back to a lenslet domain, with motion data embedded for each microlens.

Each of the primary subaperture images may have pixels from a primary location on each lenslet image. Computing the motion vectors may include calculating the disparity between the primary subaperture images and a plurality of proximate subaperture images, each of which has pixels from a proximate location on each lenslet image that is near the primary location. Computing motion vectors may further include calculating additional disparities between additional primary subaperture images and additional subaperture images of the mosaic of subaperture images.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 12A and 12B are diagrams depicting two examples of shutter reconstruction, according to certain embodiments.

DEFINITIONS

Figure 1:
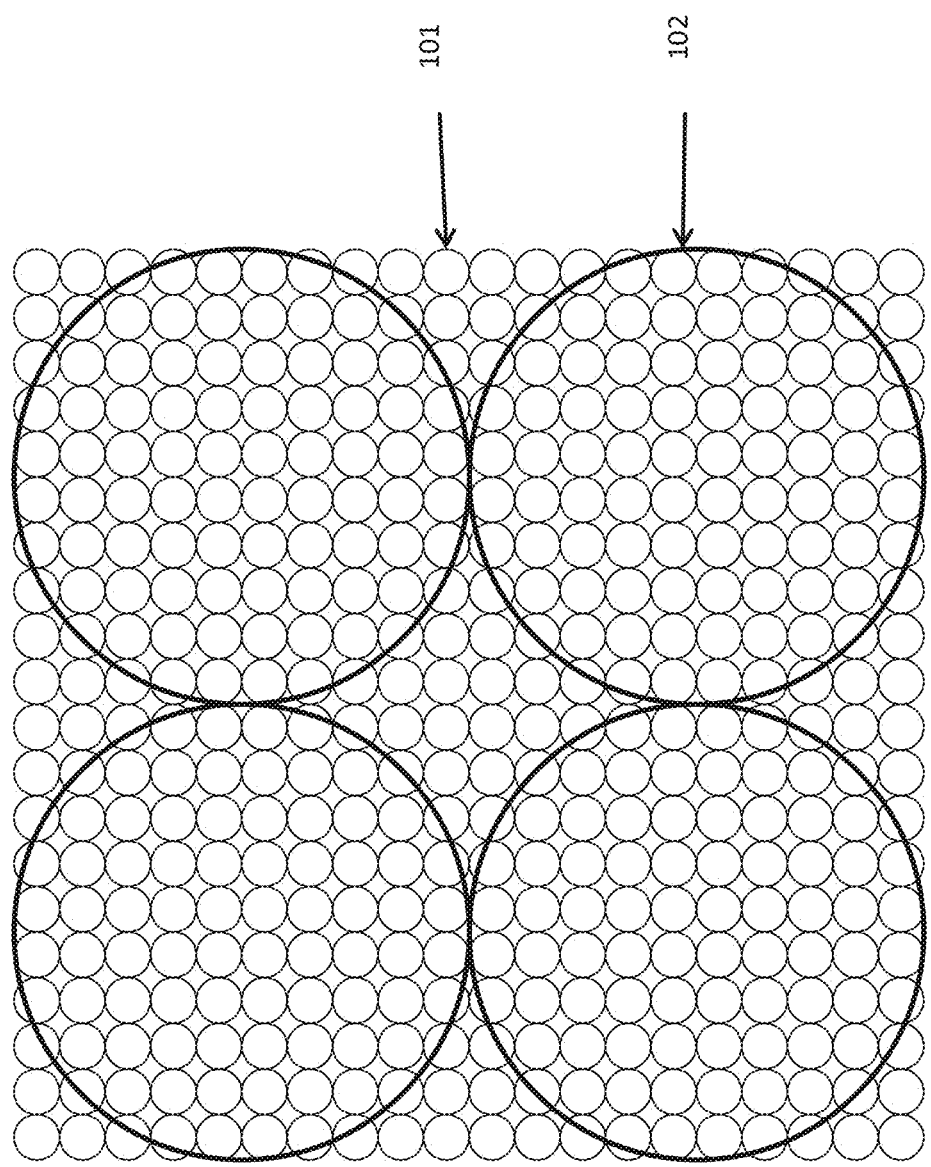
FIG. 1 depicts a portion of a light-field image.

For purposes of the description provided herein, the following definitions are used:

Blurred light-field image: a light-field image to which blurring has been applied via modification of RGB values, or to which motion vectors have been added to facilitate the generation of blurred projections.

Blur-ready mosaic: a mosaic (for example, of subaperture images) in which motion vectors have been embedded such that proper blur can be readily determined.

Depth: a representation of distance between an object and/or corresponding image sample and a microlens array of a camera. Depth may be expressed in image coordinates, for example, as the position of an object in increments of focal length, and/or in object coordinates, for example, in diopters.

Depth map: a two-dimensional map corresponding to a light-field image, indicating a depth for each of multiple pixel samples within the light-field image.

Disk: a region in a light-field image that is illuminated by light passing through a single microlens; may be circular or any other suitable shape.

Disparity: The temporal difference between portions, such as pixels, of successive images.

Grid: a two-dimensional arrangement with regular spacing between elements along a first direction, and regular spacing along a second direction orthogonal to the first direction.

Image: a two-dimensional array of pixel values, or pixels, each specifying a color.

Lenslet image: the portion of a light-field image that corresponds to one microlens of the microlens array.

Light-field image: an image that contains a representation of light-field data captured at the sensor.

Microlens: a small lens, typically one in an array of similar microlenses.

Microlens array: multiple microlenses arranged in a pattern to define an array.

Mosaic: A pattern, such as a two-dimensional grid or hexagonal pattern, of images.

Motion blur: image blurring applied to an object and/or a portion of an image to indicate motion. This is in contrast to defocus blur, which is caused when the camera is not in focus on a portion of an image.

Motion vector: an indication of direction and displacement, velocity, or acceleration, of an object and/or a portion of an image, between subsequent frames. Motion vectors may include displacement vectors indicating motion of pixels between subsequent frames, velocity vectors, indicating, as a first derivative of motion vectors, velocity of pixels between subsequent frames, and/or acceleration vectors, indicating, as a second derivative of motion vectors, acceleration of pixels between subsequent frames.

Optical flow: the determination of motion, that is, direction and displacement, of individual pixels between subsequent frames.

Subaperture image: an image made up of the pixels from substantially the same location on each of a plurality of lenslet images.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
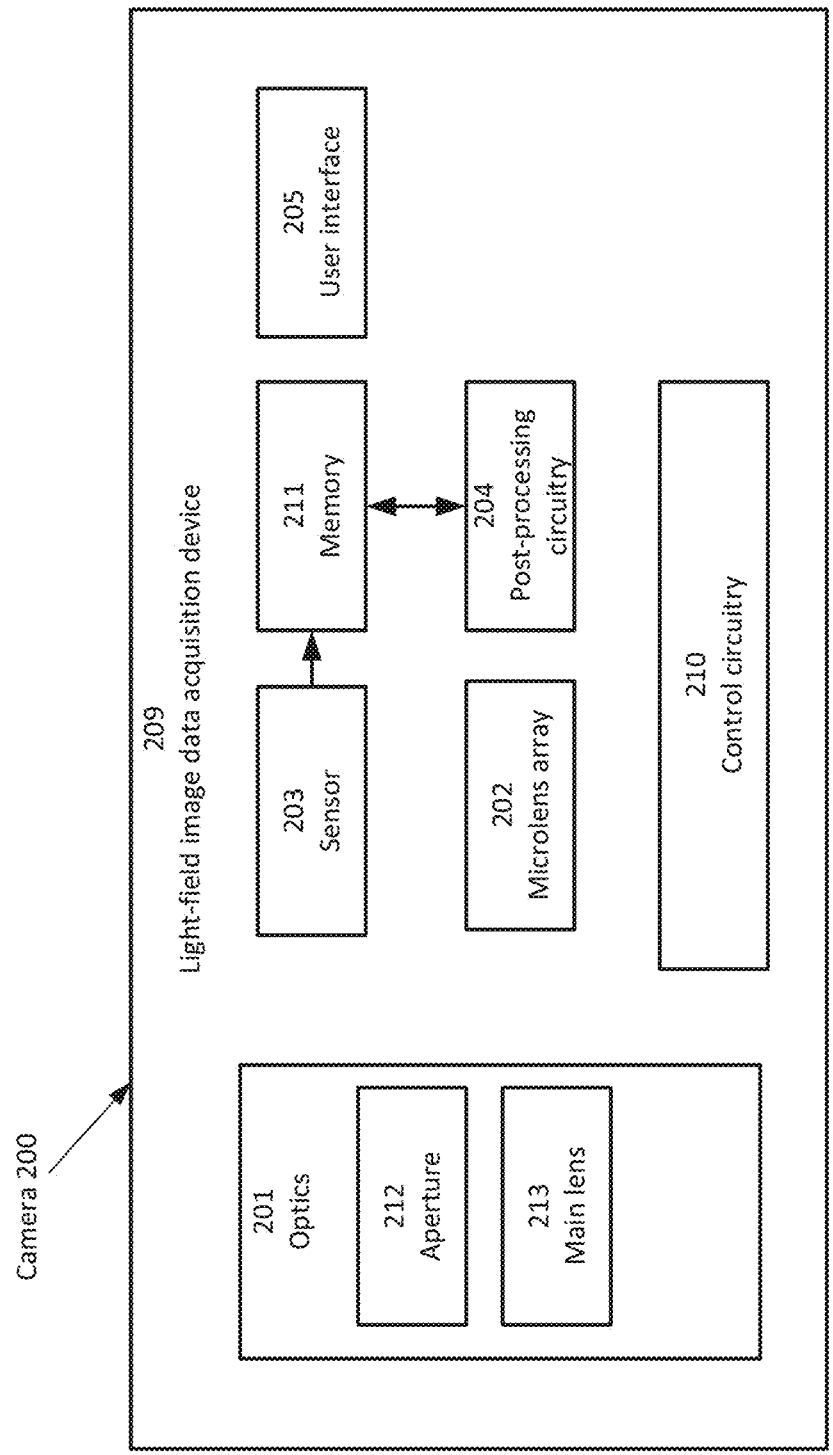
FIG. 2 depicts an example of an architecture for implementing the methods of the present disclosure in a light-field capture device, according to one embodiment.
Figure 3:
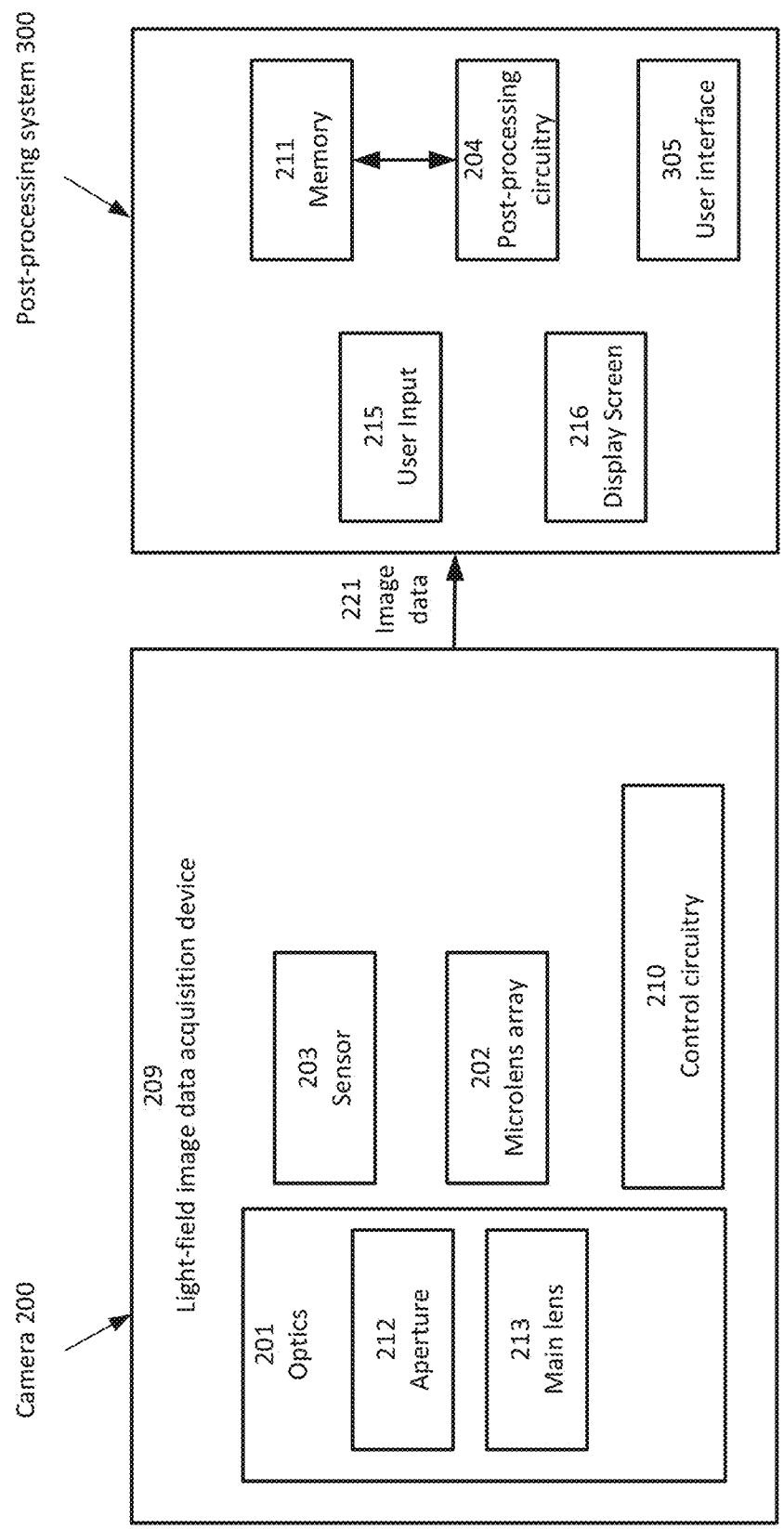
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
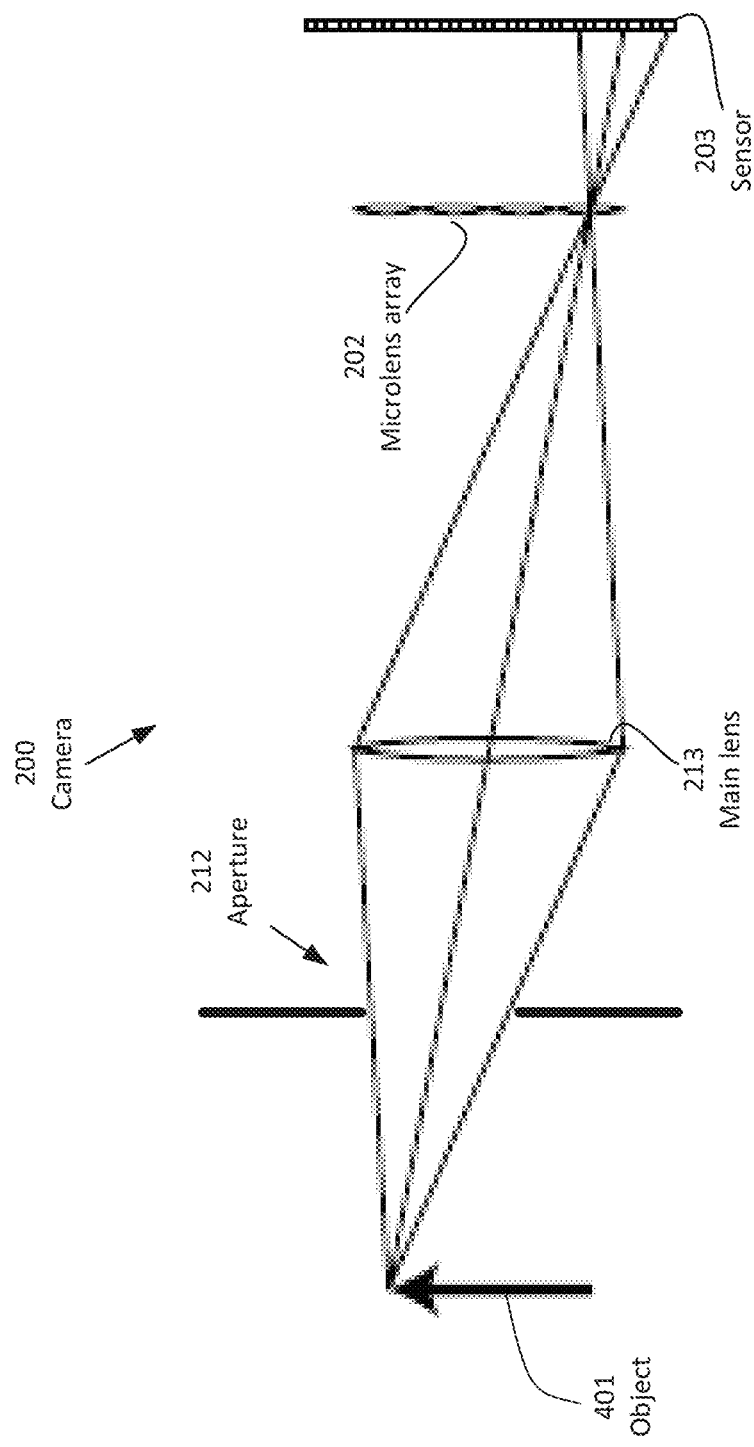
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. Referring now also to FIG. 4, there is shown an example of an architecture for a light-field camera 200 for implementing the method of the present disclosure according to one embodiment. The Figure is not shown to scale. FIG. 4 shows, in conceptual form, the relationship between aperture 212, main lens 213, microlens array 202, and image sensor 203, as such components interact to capture light-field data for one or more objects, represented by an object 401.

In at least one embodiment, light-field camera 200 may also include a user interface 205 for allowing a user to provide input for controlling the operation of camera 200 for capturing, acquiring, storing, and/or processing image data.

Similarly, in at least one embodiment, post-processing system 300 may include a user interface 305 that allows the user to provide input to control the manner in which post-processing, such as motion blur application, is carried out. The user interface 305 may additionally or alternatively facilitate the receipt of user input from the user to establish one or more parameters of subsequent image processing.

In at least one embodiment, light-field camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

For example, camera 200 may store raw light-field image data, as output by image sensor 203, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 211 can also store data representing the characteristics, parameters, and/or configurations (collectively "configuration data") of device 209.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol can be used for transmitting image data 221 to circuitry 204; for example camera 200 can transmit image data 221 and/or other data via the Internet, a cellular data network, a WiFi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 215 and/or a display screen 216. If desired, light-field image data may be displayed for the user on the display screen 216.

Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across. Since, in at least one embodiment, disks 102 are circular, only pixels within the circular shape of the disk 102 contribute to angular information; accordingly, each lenslet may provide $$\frac{\pi d^2}{4}$$

pixels containing angular information, where d is the diameter of each disk 102, in pixels.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. Examples of such techniques, including for example modulation, demodulation, and demosaicing, are described in related U.S. application Ser. No. 13/774,925 for "Compensating for Sensor Saturation and Microlens Modulation During Light-Field Image Processing", filed Feb. 22, 2013, the disclosure of which is incorporated herein by reference.

Figure 5:
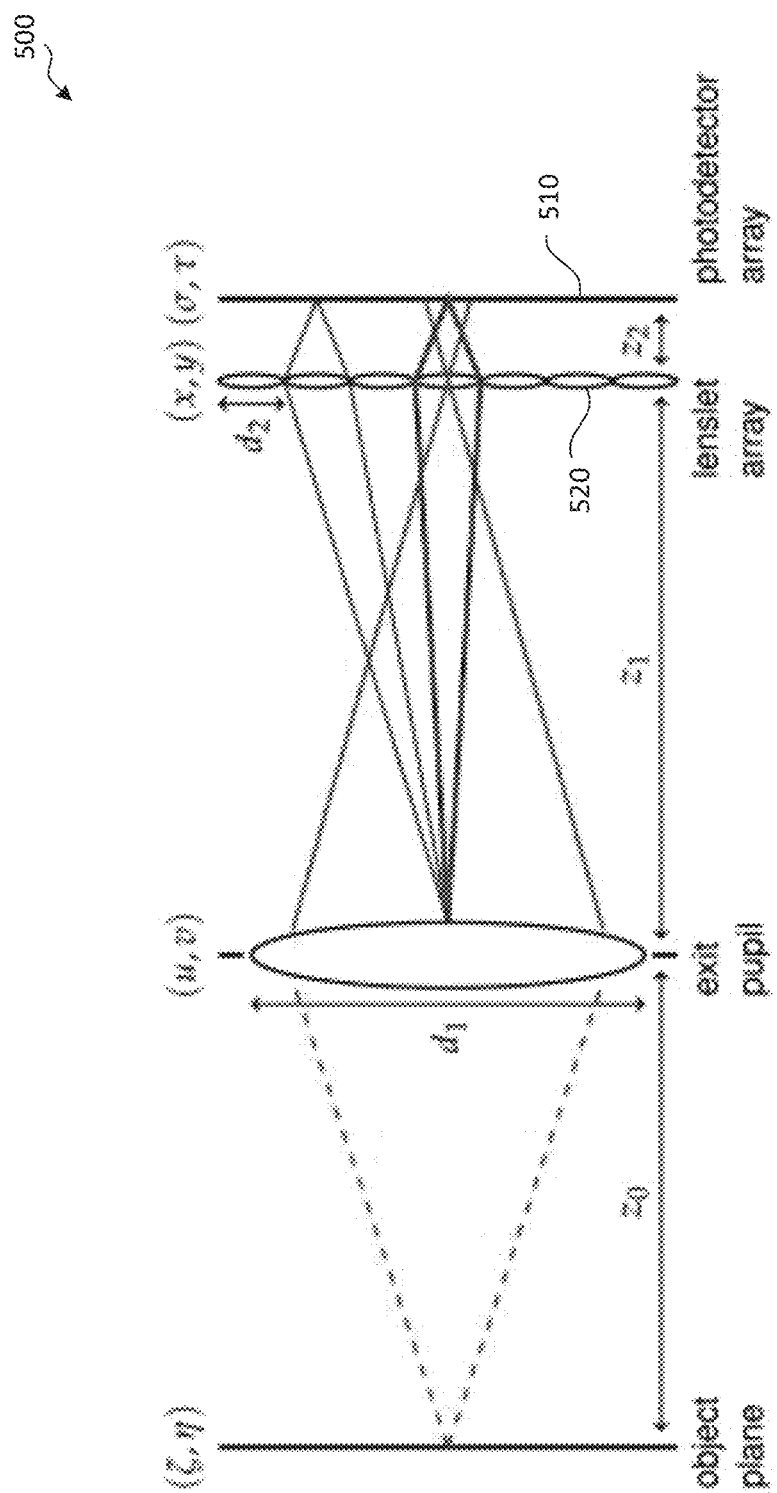
FIG. 5 is an image depicting four-dimensional capture of scene data, according to one embodiment.

Referring to FIG. 5, an image 500 depicts four-dimensional capture of scene data, according to one embodiment. The light-field may represent not only the color and amplitude of the rays entering the exit pupil, but also the direction. As mentioned previously, this directional information may be provided by redirecting incoming light rays with the microlens array. The resulting raw light-field image received from the image sensor (or photodetector array 510) may have a plurality of lenslet images arranged in a matrix, for example, in a rectangular grid or hexagonal pattern. Each lenslet image may be the portion of the light-field image that is captured through a single microlens of the microlens array (or lenslet array 520).

Motion Blur Generation

Figure 6:
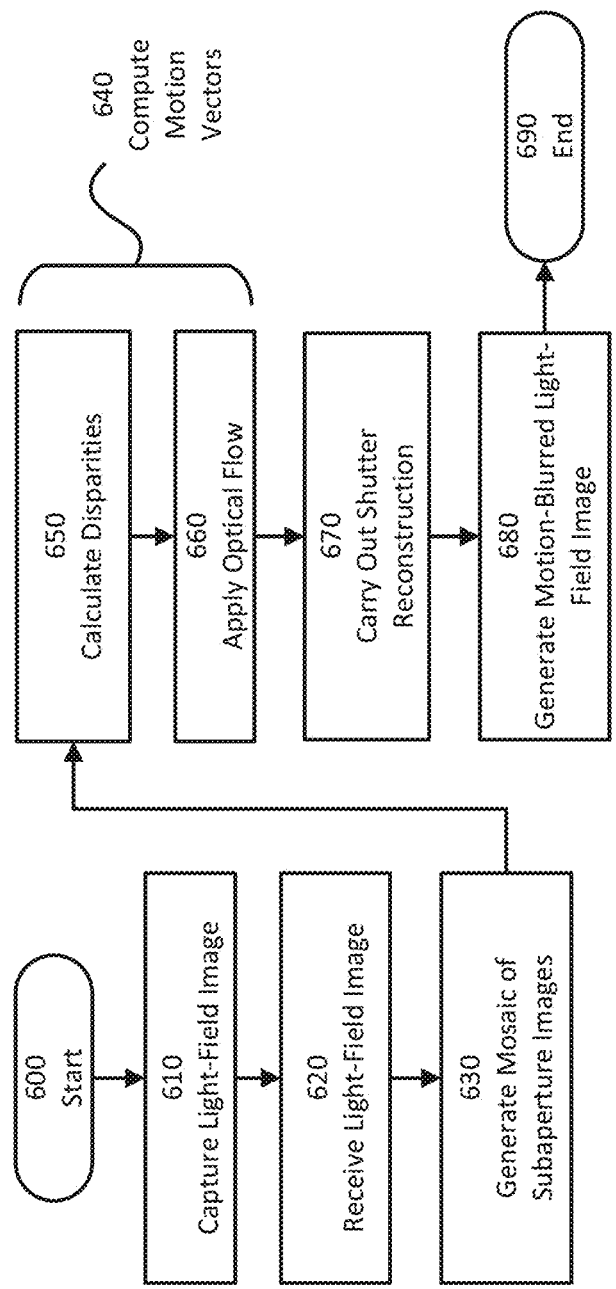
FIG. 6 is a flow diagram depicting a method for generating motion blur in a light-field image, according to one embodiment.

Referring to FIG. 6, a flow diagram depicts a method for generating motion blur in a light-field image, according to one embodiment. The method may be performed on a light-field image captured through the use of a light-field camera such as the camera 200 of FIGS. 2 and 3. Alternatively, the method may be performed on other images containing more than just two-dimensional image data, such as stereoscopic or multiscopic images.

As shown in FIG. 6, the method may start 600 with a step 610 in which the light-field image is captured. This may be done through the use of a light-field camera such as the camera 200 of FIGS. 2 and 3, as indicated previously. In the alternative, the light-field image may be captured with a differently-configured camera capable of capturing light-field images. The light-field image may have a plurality of lenslet images, each of which corresponds to one microlens of the microlens array. The lenslet images may be arranged in a regular fashion, in the light-field image, in a rectangular grid, a hexagonal pattern, or the like.

In a step 620, the light-field image may be received in a data store. The data store may be, for example, the memory 211 of the camera 200, or the memory of a separate computing devices, such as the memory 211 of the post-processing system 300 of FIG. 3.

In a step 630, a mosaic of subaperture images may be generated. A subaperture image is the image generated by taking one or more pixels from the same location (a "primary location") on each of the lenslet images and combining them, for example, in an arrangement that mirrors the relative positions of the lenslet images.

In a step 640, motion vectors may be computed to indicate motion occurring within at least one of the subaperture images, which will hereafter be referred to a as a primary subaperture image. Motion vectors may optionally be computed for multiple additional primary subaperture images, and even for all of the subaperture images of the mosaic. The step 640 may be carried out in various ways. In some exemplary embodiments, the motion vectors may be computed through the use of a step 650 and a step 660, as shown.

In the step 650, disparities may be calculated between each primary subaperture image and a number of proximate subaperture images. Each proximate subaperture image may have one or more pixels from a proximate location on each of the lenslet images that is proximate to the primary location. The proximate subaperture images may be located on opposite sides of the primary subaperture image in the mosaic, or may even define a ring around the primary subaperture image, in the mosaic. If desired, disparities for each subaperture image of the mosaic may be calculated.

In the step 660, an optical flow may be applied to ascertain the motion vectors In a step 670, shutter reconstruction may be carried out through the use of the motion vectors. Certain imaging settings, such as a capture frame rate, may be established for a hypothetical camera. The result may be the generation of a blur-ready mosaic of subaperture images. In some embodiments, back projection may be applied to the blur-ready mosaic of subaperture images to generate a four-dimensional light-field. Such application of back projection may utilize the disparities calculated in the step 650. If back projection is omitted in the step 670, the step 650 may also optionally be omitted.

In a step 680, the blur-ready mosaic of subaperture images may be used to generate a motion-blurred light-field image. In some embodiments, the step 680 may include transformation of the blur-ready mosaic of subaperture images back to the lenslet domain of the original light-field image. Motion data may be embedded for each microlens. Thus, the motion-blurred light-field image may support multiple perspectives. For example, if a viewer processes the motion-blurred light-field image to change the Center of Perspective, the embedded motion data may enable motion blur of the objects appearing in the processed image to be displayed accurately from the new Center of Perspective. The method may then end 690.

These steps are merely exemplary. Those of skill in the art will recognize that various steps of the method of FIG. 6 may be omitted, replaced with alternative steps, and/or supplemented with additional steps not specifically set forth herein. The steps 630, 650, 660, 670, and 680 will be described in greater detail in connection with FIGS. 7 through 14, as follows.

Subaperture Images

Figure 7:
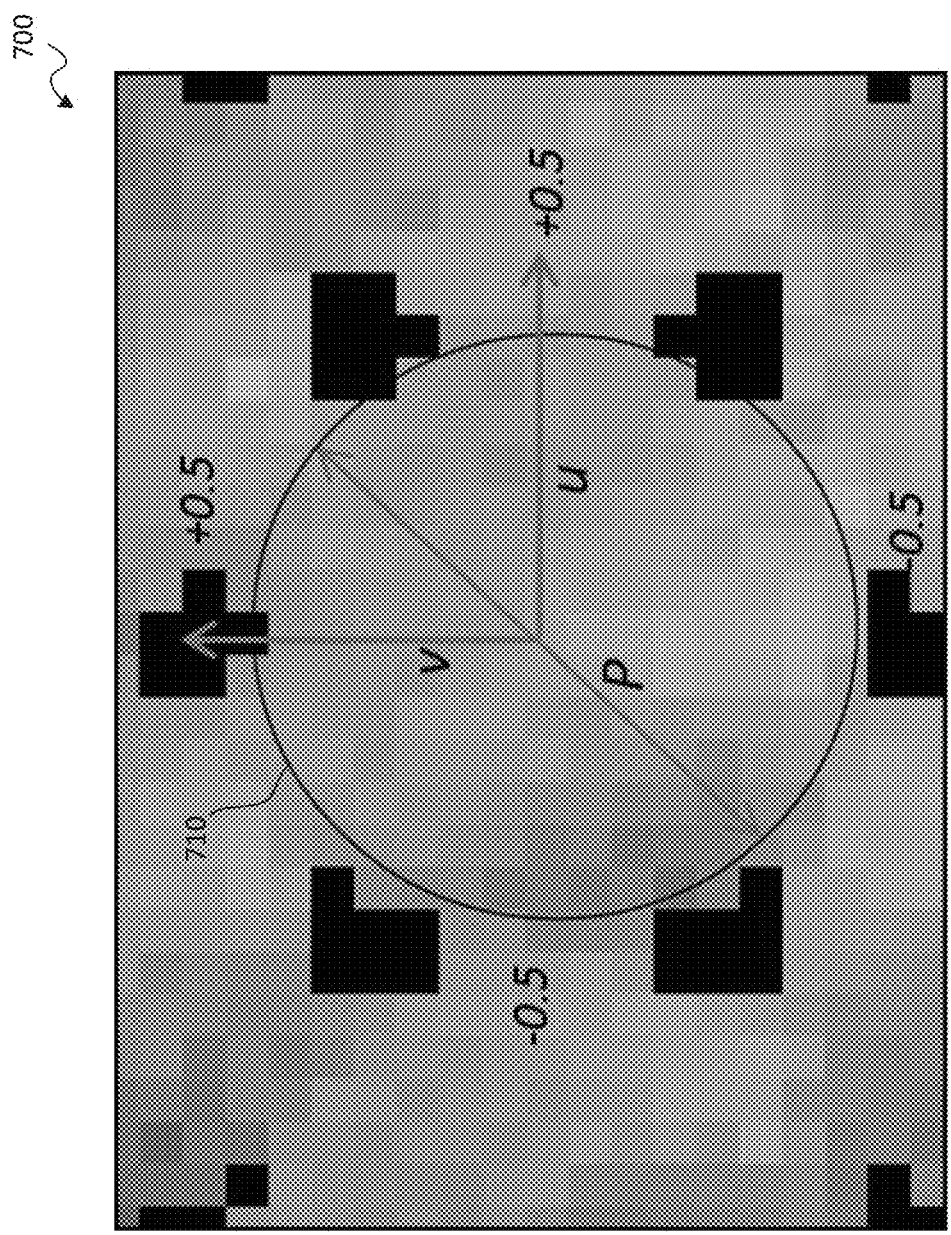
FIG. 7 is a screenshot diagram depicting a portion of a light-field image showing a lenslet image, according to one embodiment.

Referring to FIG. 7, a screenshot diagram 700 depicts a portion of a light-field image showing a lenslet image 710, according to one embodiment. In this the example, lenslet image 710 is generally circular in shape, with dark patches appearing in the interstitial spaces between adjacent lenslet images. The lenslet image 710 may include all of the pixels generated from light captured through one microlens of the microlens array 202. The coordinates u and v may be used to express the location of a pixel within the lenslet image 710, and the coordinates x and y may be used to express the location of a lenslet image 710 among the other lenslet images of the light-field image.

Pursuant to the step 630, the lenslet images 710 of the light-field image may be used to generate the mosaic of subaperture images. Specifically, one or more pixels from the same location on each of the lenslet images 710 may be combined together and arranged in a manner that matches the arrangement of the lenslet images 710 to generate each subaperture image. Thus, a subaperture image may be defined as a set of pixels from the same (u,v) coordinate in each lenslet image, of diameter P pixels, in the raw light-field image. The mosaic of subaperture images may be generated by arranging the subaperture images in a pattern corresponding to the location, from each lenslet image, from which the pixels were obtained to generate the subaperture image.

The sub-aperture images from the light-field image may represent different views of the scene captured in the light-field image, as seen from the main objective or main lens. The consolidated pixels from one (u,v) coordinate may make up a view, which may be represented by one of the subaperture images.

Figure 8:
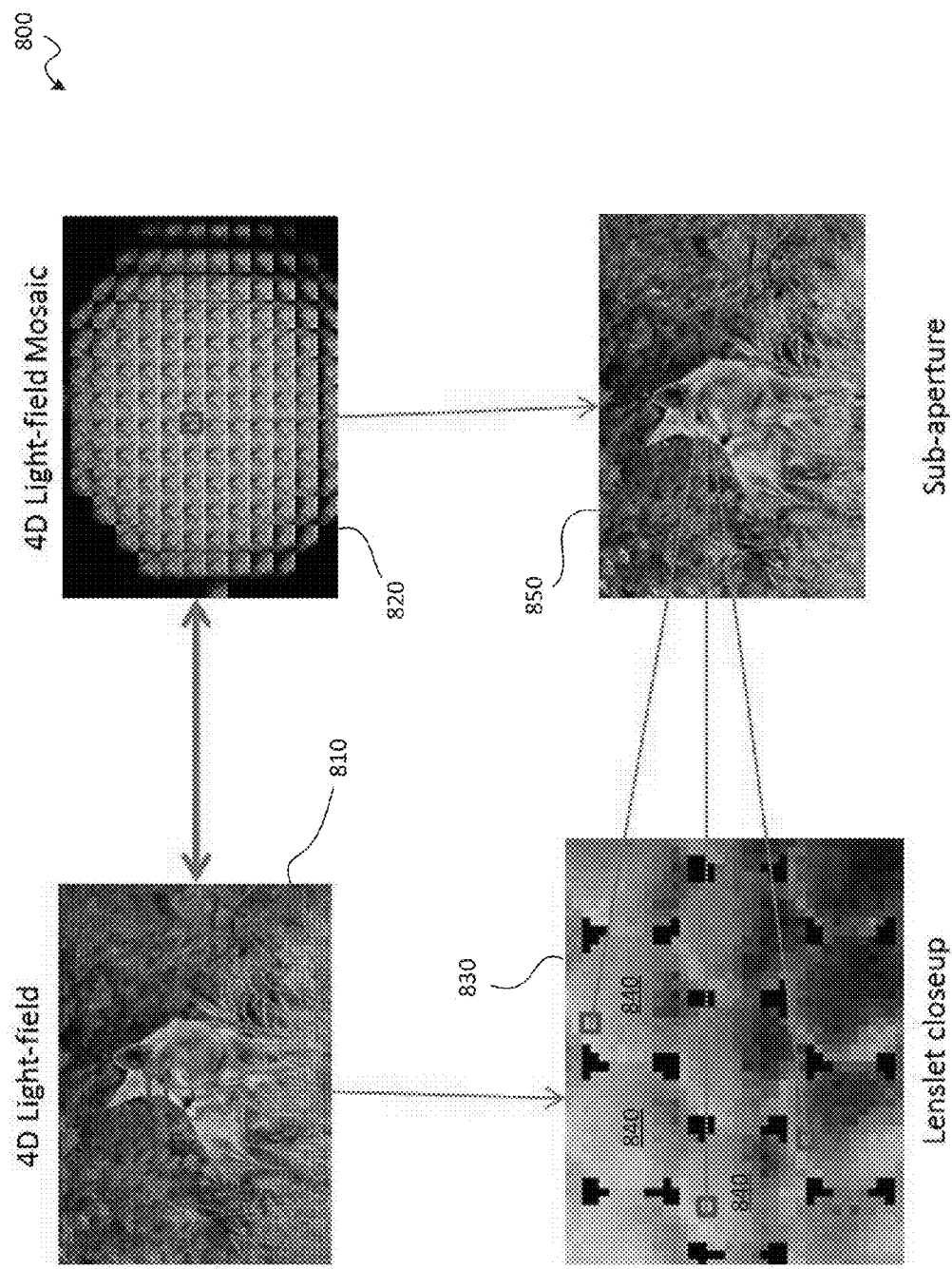
FIG. 8 is a set of screenshot diagrams depicting the relationship between a four-dimensional light-field and a four-dimensional light-field mosaic of subaperture images, according to one embodiment.

Referring to FIG. 8, a set of screenshot diagrams 800 depicts the relationship between a four-dimensional light-field and a four-dimensional light-field mosaic of subaperture images, according to one embodiment. Specifically, a raw light-field image 810 may be converted to a mosaic 820 of subaperture images in the step 630. An exploded view 830 illustrates some of the lenslet images 840 of the raw light-field image 810. The lenslet images 840 may be similar to the lenslet image 710 depicted in FIG. 7. An exploded view illustrates one subaperture image 850 of the mosaic 820 in greater detail. As shown, the subaperture image 850 may depict the scene captured in the raw light-field image 810, at lower resolution and without data indicative of the angle at which light rays are received by the image sensor 203.

In some embodiments, the raw light-field image 810 may be transformed from a regular or hexagonal lenslet configuration, as shown in FIG. 8, to the mosaic 820 of sub-apertures without loss of resolution or image quality. This pixel-by-pixel transformation can take into account microlens array rotation and/or offsets. The process may also be fully reversible. Transforming the raw light-field image 810 into the mosaic 820 may allow for operations to be executed on a per view basis.

Calculating Disparities

In one embodiment, temporal disparity, referred to hereafter as simply "disparity," in the step 650, may be determined between pairs of sub-aperture images and from operations used to extract depth information. The quality of the resulting depth information may be dependent on the quality of the disparity and thus the number of subaperture images used. Use of more subaperture images may lead to better quality depth data, and hence, to depth information having a higher accuracy and/or resolution.

Figure 9B:
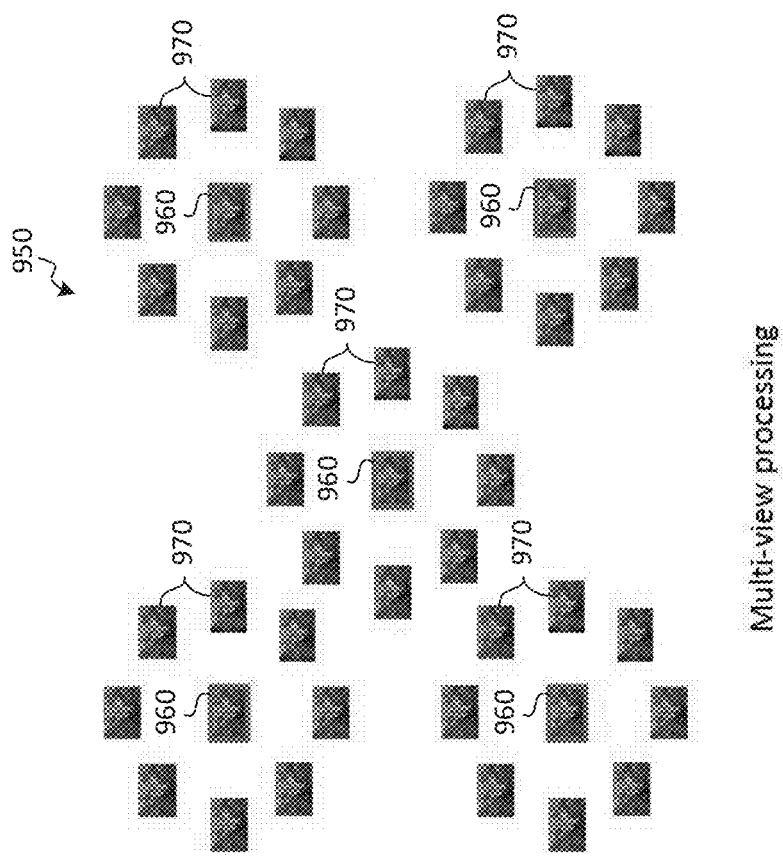
FIGS. 9A and 9B are sets of subaperture images depicting light-field processing on a single subaperture image and on multiple subaperture images, according to certain embodiments.
Figure 9A:
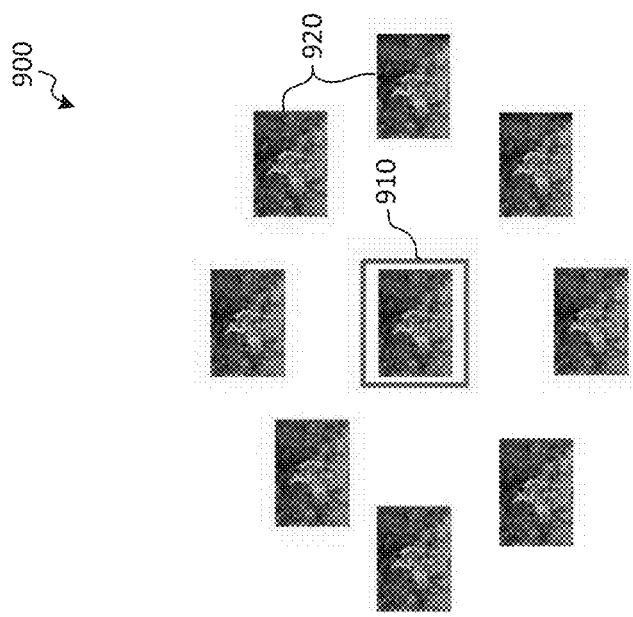

Referring to FIGS. 9A and 9B, a set 900 and a set 950 of subaperture images depict light-field processing on a single subaperture image and on multiple subaperture images, respectively, according to certain embodiments. Light-field processing such as depth processing can be applied on a single central sub-aperture or multiple sub-apertures.

The disparity may be calculated from proximate subaperture images on opposite sides of the primary subaperture image, or more particularly, from proximate subaperture images arranged in a ring surrounding the primary subaperture image(s). As shown, the set 900 of subaperture images of FIG. 9A shows one primary subaperture image 910 surrounded by a ring of proximate subaperture images 920. The proximate subaperture images 920 may beneficially be substantially equidistant from the primary subaperture image in the mosaic 820. The set 950 of subaperture images of FIG. 9B shows multiple primary subaperture images 960, each of which is surrounded by a ring of proximate subaperture images 970.

The primary subaperture image 910 or one of the primary subaperture images 960 may be compared with the corresponding proximate subaperture images 920 or the corresponding proximate subaperture images 970, respectively, to calculate the disparity for that primary subaperture image. Processing multiple views, or multiple subaperture images, may provide access to occlusion data that may not otherwise be available if the disparity is calculated for only a single primary subaperture image.

Applying Optical Flow

As mentioned previously, optical flow may be applied to compute the motion vectors in the step 660. Optical flow may be applied to each or a subset of the primary subaperture. The result may be the production of an N×N four-dimensional motion vector data set, potentially leveraging multiple subaperture images to calculate the motion vectors as volumetric flow vectors.

Optical flow analysis may help to determine the depth of objects to which motion blur is to be applied. Depth determination facilitates proper application of motion blur in a light-field image. If desired, LIDAR and/or other depth measurement techniques may be used to facilitate accurate depth determination for proper motion blur application.

The motion vectors may include forward and backward displacements for each subaperture image or for a subset of the subaperture images. In the case of light-field video, the motion vectors may be applied to the subaperture images on a per-frame basis, with changes in the motion vectors reflecting changes in motion of the objects represented in the light-field video. A forward motion vector may indicate motion from one frame to the next frame, while a backward motion vector may indicate motion from one frame to the previous frame.

A full four-dimensional motion vector set may allow for motion estimation of occluded regions and may provide significantly higher accuracy through the aggregation of multiple viewpoints. A full four-dimensional motion vector set may also define the three-dimensional flow of the scene depicted in the light-field image, which may be part of a light-field video.

It may enhance processing efficiency to leverage back projection from single, or multiple sub-aperture RGB and/or motion vectors in order to produce the final four-dimensional RGB mosaic and/or four-dimensional motion vectors. Back projection will be described in greater detail subsequently. Depth information single view or multi-view form may facilitate accurate back projection, and more calculated viewpoints (i.e., calculation of motion vectors for more subaperture images) may permit generation of more accurate four-dimensional results.

Figure 10:
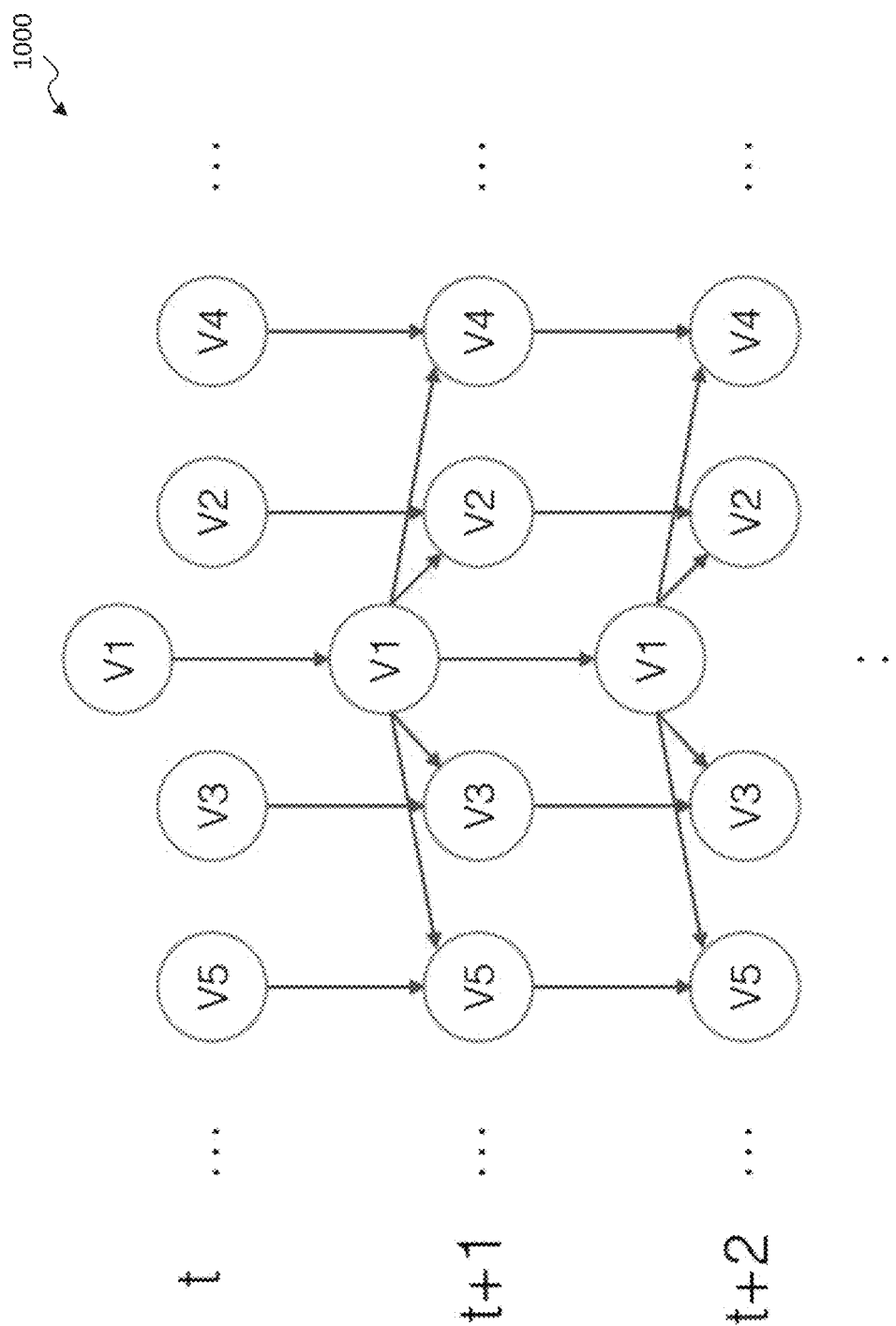
FIG. 10 is a diagram depicting data cost terms in light-field video optical flow estimation, according to one embodiment.

Referring to FIG. 10, a diagram 1000 depicts data cost terms in light-field video optical flow estimation, according to one embodiment. Optical flow estimation for a larger number of subaperture images, or viewpoints (shown as V1 through V5), may require more computing power and/or data storage.

Figures 11A, 11B:
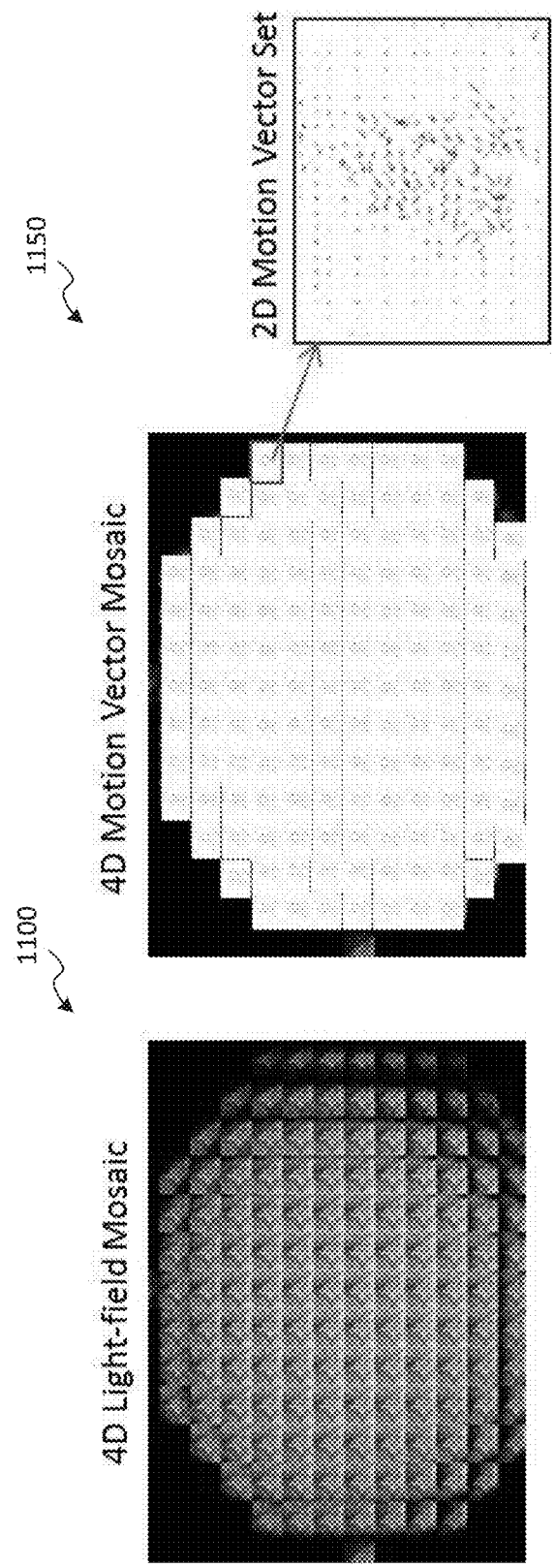
FIGS. 11A and 11B are diagrams depicting a mosaic of subaperture images derived from a light-field image, and a four-dimensional mosaic of the corresponding motion vectors that may be obtained via optical flow application, according to one embodiment.

Referring to FIGS. 11A and 11B, a diagram 1100 and a diagram 1150, respectively, depict a mosaic of subaperture images derived from a light-field image, and a four-dimensional mosaic of the corresponding motion vectors that may be obtained via optical flow application, according to one embodiment. Each subaperture image of the mosaic of the diagram 1150 may have a two-dimensional motion vector set as shown in the enlarged portion of the diagram 1150, representing one of the subaperture images. When the motion vectors for all of the subaperture images are aggregated and arranged in the mosaic pattern shown, the resulting combined two-dimensional motion vector sets constitute a four-dimensional motion vector set for the light-field image.

Shutter Reconstruction

The degree of motion blur in a video may be defined by the relationship between the exposure speed and the frame rate. This is typically defined in cinematography by the shutter angle, where a small shutter angle typifies a static, sharp image (no blur) at each frame and larger angles typify progressively increasing degrees of motion blur.

Pursuant to the step 670, four-dimensional shutter reconstruction may be carried out based on the four-dimensional light-field mosaic and four-dimensional motion vector mosaic, as shown and described in connection with FIGS. 11A and 11B. For a given camera frame rate and exposure integration time, a light-field image or video can be resampled and filtered to generate a new frame rate and exposure level. The first step may be to calculate the equivalent integration time. Multiple frames may then be interpolated in between source frames. The sequence may then be resampled. Examples will be shown and described in connection with FIGS. 12A and 12B.

Referring to FIGS. 12A and 12B, a diagram 1200 and a diagram 1250, respectively, depict two examples of shutter reconstruction, according to certain embodiments. The diagram 1200 depicts native light-field video at 120 frames per second with a 360° shutter angle. Five frames may be used to generate 24 frames per second at a 360° shutter angle. The diagram 1250 depicts generation of frames to obtain 24 frames per second at a 180° shutter angle. Ten samples are interpolated between the frames.

Computationally, higher shutter angles are possible. Any number of images may be interpolated between each interval. A higher number of interpolated images between each interval may increase accuracy.

Back Projection

The step 670 may include applying back projection to the subaperture images. Back-projection may involve reversing projection to produce a four-dimensional light-field from an image and its corresponding depth map. The process of back projection may be almost the same as that of projection, except that instead of splatting the light-field intensity into the reconstructed image, the light-field intensity may be interpolated from the image.

Back projection may entail back-projecting the depth (the Z-component) from the light-field image, plus the forward and backward motion vectors, into the light-field image. The depth may be ascertained in the course of optical flow analysis, as described previously.

Back projection may be applied to produce four-dimensional light-field data, which may include RGB, depth, and/or vector data, and then to produce a mosaic such as the mosaic of the diagram 1150. This can then be transferred back to the light-field without loss of resolution and with complete four-dimensional motion blur applied at the lenslet level.

One simple algorithm may function as follows:
For each sample (pixel) in the light-field, the (x,y,u,v) coordinates may be computed or retrieved.
Given a depth (which can be specified, taken from a depth map, etc.) the output (s,t) coordinates in the image may be calculated via the refocus equation.
The pixel intensity of the light-field sample at (x,y,u,v) may then be interpolated from the image at position (s,t).

For optimal light-field creation, the image used to back project may advantageously be an extended depth-of-field (EDOF) image or an image with similarly large depth-of-field. Such an image need not be an "image" in the traditional sense, but may instead be a set of depth information, flow vectors, and/or the like.

Figure 13:
FIG. 13 is a chart depicting the combinations of data that may be implemented for efficient back projection, according to certain embodiments.

Referring to FIG. 13, a chart 1300 depicts the combinations of data that may be implemented for efficient back projection, according to certain embodiments. As shown, single view or multi-view processing (i.e., single subaperture image processing or multiple subaperture image processing) may be undertaken, relative to any of RGB data, motion vector data, and depth data.

Transformation

Pursuant to the step 680, the blur-ready mosaic of subaperture images may then be transformed back to the four-dimensional light-field whereby motion is embedded for each microlens. This may entail transforming the mosaic back to the lenslet domain of the original light-field image, as in the raw light-field image 810 of FIG. 8. This may result in the generation of a motion-blurred light-field image that allows for the four-dimensional light-field to be refocused and/or processed to alter its Center of Perspective, adding motion blur that is optically correct at any focus setting and/or Center of Perspective.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for blurring a light-field image, the method comprising:
   in a data store, receiving a light-field image that has been captured with a light-field camera comprising an aperture, an image sensor, and a microlens array positioned between the aperture and the image sensor, wherein the light-field image comprises a plurality of lenslet images, each of which corresponds to one microlens of the microlens array;
   in a processor, using the light-field image to generate a mosaic of subaperture images, each of which comprises pixels from the same location on each of the lenslet images;
   in the processor, computing motion vectors indicative of motion of at least a primary subaperture image of the mosaic of subaperture images;
   in the processor, using the motion vectors to carry out shutter reconstruction of the mosaic of subaperture images to generate a blur-ready mosaic of subaperture images;
   in the processor, using the blur-ready mosaic of subaperture images to generate a motion-blurred light-field image; and
   outputting the motion-blurred light-field image.

2. The method of claim 1, further comprising, prior to receiving the light-field image, capturing the light-field image in the light-field camera.

3. The method of claim 1, wherein:
   the primary subaperture image comprises pixels from a primary location on each of the lenslet images; and
   computing the motion vectors comprises calculating a temporal disparity between the primary subaperture image and a plurality of proximate subaperture images, each of which comprises pixels from a proximate location on each of the lenslet images that is proximate the primary location.

4. The method of claim 3, wherein computing the motion vectors further comprises calculating additional disparities between additional primary subaperture images of the mosaic of subaperture images, and additional subaperture images of the mosaic of subaperture images.

5. The method of claim 3, wherein the proximate subaperture images are selected such that the proximate locations are positioned on opposite sides of the primary location on each of the lenslet images.

6. The method of claim 5, wherein the proximate subaperture images are further selected such that the proximate locations define a ring that encircles the primary location on each of the lenslet images.

7. The method of claim 1 wherein computing the motion vectors further comprises applying an optical flow to at least the primary subaperture image.

8. The method of claim 1, wherein the motion vectors comprise a full four-dimensional motion vector set defining a three-dimensional flow of objects represented in the light-field image.

9. The method of claim 8, wherein the motion vectors comprise forward motion vectors indicative of motion of the objects in time subsequent to capture of the light-field image, and backward motion vectors indicative of motion of the objects in time prior to capture of the light-field image.

10. The method of claim 1, wherein using the motion vectors to carry out shutter reconstruction of the mosaic of subaperture images comprises applying back projection to the blur-ready mosaic of subaperture images to generate a four-dimensional light-field.

11. The method of claim 1, wherein using the blur-ready mosaic of subaperture images to generate the motion-blurred light-field image comprises transforming the blur-ready mosaic of subaperture images back to a lenslet domain, with motion data embedded for each microlens.

12. A non-transitory computer-readable medium for blurring a light-field image, comprising instructions stored thereon, that when executed by one or more processors, perform the steps of:
   causing a data store to receive a light-field image that has been captured with a light-field camera comprising an aperture, an image sensor, and a microlens array positioned between the aperture and the image sensor, wherein the light-field image comprises a plurality of lenslet images, each of which corresponds to one microlens of the microlens array;
   using the light-field image to generate a mosaic of subaperture images, each of which comprises pixels from the same location on each of the lenslet images;
   computing motion vectors indicative of motion of at least a primary subaperture image of the mosaic of subaperture images;
   using the motion vectors to carry out shutter reconstruction of the mosaic of subaperture images to generate a blur-ready mosaic of subaperture images;
   using the blur-ready mosaic of subaperture images to generate a motion-blurred light-field image; and
   causing an output device to output the motion-blurred light-field image.

13. The non-transitory computer-readable medium of claim 12, wherein:
   the primary subaperture image comprises pixels from a primary location on each of the lenslet images; and
   computing the motion vectors comprises calculating a temporal disparity between the primary subaperture image and a plurality of proximate subaperture images, each of which comprises pixels from a proximate location on each of the lenslet images that is proximate the primary location.

14. The non-transitory computer-readable medium of claim 13, wherein computing the motion vectors further comprises calculating additional disparities between additional primary subaperture images of the mosaic of subaperture images, and additional subaperture images of the mosaic of subaperture images.

15. The non-transitory computer-readable medium of claim 13, wherein the proximate subaperture images are selected such that the proximate locations are positioned on opposite sides of the primary location on each of the lenslet images and define a ring that encircles the primary location on each of the lenslet images.

16. The non-transitory computer-readable medium of claim 12, wherein the motion vectors comprise a full four-dimensional motion vector set defining a three-dimensional flow of objects represented in the light-field image.

17. The non-transitory computer-readable medium of claim 16, wherein the motion vectors comprise forward motion vectors indicative of motion of the objects in time subsequent to capture of the light-field image, and backward motion vectors indicative of motion of the objects in time prior to capture of the light-field image.

18. The non-transitory computer-readable medium of claim 12, wherein using the motion vectors to carry out shutter reconstruction of the mosaic of subaperture images comprises applying back projection to the blur-ready mosaic of subaperture images to generate a four-dimensional light-field.

19. The non-transitory computer-readable medium of claim 12, wherein using the blur-ready mosaic of subaperture images to generate the motion-blurred light-field image comprises transforming the blur-ready mosaic of subaperture images back to a lenslet domain, with motion data embedded for each microlens.

20. A system for blurring a light-field image, the system comprising:
   a data store configured to receive a light-field image that has been captured with a light-field camera comprising an aperture, an image sensor, and a microlens array positioned between the aperture and the image sensor, wherein the light-field image comprises a plurality of lenslet images, each of which corresponds to one microlens of the microlens array;
   a processor, communicatively coupled to the data store, configured to:
      use the light-field image to generate a mosaic of subaperture images, each of which comprises pixels from the same location on each of the lenslet images;
      compute motion vectors indicative of motion of at least a primary subaperture image of the mosaic of subaperture images;
      use the motion vectors to carry out shutter reconstruction of the mosaic of subaperture images to generate a blur-ready mosaic of subaperture images; and
      use the blur-ready mosaic of subaperture images to generate a motion-blurred light-field image; and
   an output device, communicatively coupled to the processor, configured to output the motion-blurred light-field image.

21. The system of claim 20, further comprising the light-field camera.

22. The system of claim 20, wherein:
   the primary subaperture image comprises pixels from a primary location on each of the lenslet images; and
   the processor is further configured to compute the motion vectors by calculating a temporal disparity between the primary subaperture image and a plurality of proximate subaperture images, each of which comprises pixels from a proximate location on each of the lenslet images that is proximate the primary location.

23. The system of claim 22, wherein the processor is further configured to compute the motion vectors by calculating additional disparities between additional primary subaperture images of the mosaic of subaperture images, and additional subaperture images of the mosaic of subaperture images.

24. The system of claim 22, wherein the processor is further configured to select the proximate subaperture images such that the proximate locations are positioned on opposite sides of the primary location on each of the lenslet images and define a ring that encircles the primary location on each of the lenslet images.

25. The system of claim 20, wherein the processor is further configured to compute the motion vectors such that the motion vectors comprise a full four-dimensional motion vector set defining a three-dimensional flow of objects represented in the light-field image.

26. The system of claim 25, wherein the processor is further configured to compute the motion vectors such that the motion vectors comprise forward motion vectors indicative of motion of the objects in time subsequent to capture of the light-field image, and backward motion vectors indicative of motion of the objects in time prior to capture of the light-field image.

27. The system of claim 20, wherein the processor is further configured to use the motion vectors to carry out shutter reconstruction of the mosaic of subaperture images by applying back projection to the blur-ready mosaic of subaperture images to generate a four-dimensional light-field.

28. The system of claim 20, wherein the processor is further configured to use the blur-ready mosaic of subaperture images to generate the motion-blurred light-field image by transforming the blur-ready mosaic of subaperture images back to a lenslet domain, with motion data embedded for each microlens.

* * * * *